United States Patent [19]

Osawa et al.

[11] Patent Number: 4,804,574
[45] Date of Patent: Feb. 14, 1989

[54] LAMINATED PRINTED COIL STRUCTURE

[75] Inventors: Kenji Osawa, Kanagawa; Shiyouichi Muramoto, Tokyo; Yoshio Watanabe, Tokyo; Takanori Kawahara, Tokyo; Takaaki Koizumi, Kanagawa, all of Japan

[73] Assignee: Sony Corporation, Tokyo, Japan

[21] Appl. No.: 14,267

[22] Filed: Feb. 12, 1987

[30] Foreign Application Priority Data

Feb. 12, 1986 [JP] Japan .................................. 61-29681

[51] Int. Cl.⁴ ...................... B32B 3/00; H02K 11/00; H02K 1/00; H02K 1/22
[52] U.S. Cl. .................................... 428/209; 428/901; 310/68 R; 310/184; 310/268
[58] Field of Search ............. 428/209, 901; 310/68 R, 310/184, 268

[56] References Cited

U.S. PATENT DOCUMENTS 4,658,162 4/1987 Koyama et al. ................. 310/268
4,677,332 6/1987 Heyraud ............................. 310/268

FOREIGN PATENT DOCUMENTS 0012082 2/1978 Japan ..................................... 428/901
2172436 9/1986 United Kingdom ................ 428/901

Primary Examiner—Ellis P. Robinson
Assistant Examiner—P. J. Ryan
Attorney, Agent, or Firm—Hill, Van Santen, Steadman & Simpson

[57] ABSTRACT

A laminated printed coil structure comprising a wiring board having an insulating substrate, lead terminals and connecting pad portions connected to the lead terminals and formed on one surface of the insulating substrate, and a plurality of printed coil elements each having an insulating layer, coil patterns, a pair of terminals for the coil patterns and a connecting pad electrically isolated from the terminals formed on the insulating layer. The printed coil elements are piled up and laminated on the wiring board such that the connecting pad portions of the wiring board, the terminals of the coil patterns on one of the printed coil elements and the connecting pad on another printed coil element are placed in alignment, and that each one terminal for the coil pattern on each of the printed coil elements to a respective lead terminal is connected, and that each coil pattern is from then led out to the lead terminals of the wiring board.

1 Claim, 7 Drawing Sheets

LAMINATED PRINTED COIL STRUCTURE

BACKGROUND OF THE INVENTION

The present invention relates to a laminated printed coil structure suitable for a motor coil of a compact motor, for example.

Conventionally, there has been proposed a laminated printed coil structure for a motor coil of a compact motor, for example, which structure is formed by laminating a plurality of sheets on which coil patterns are formed and disposing such laminated sheets on a printed wiring board.

Figure 4:
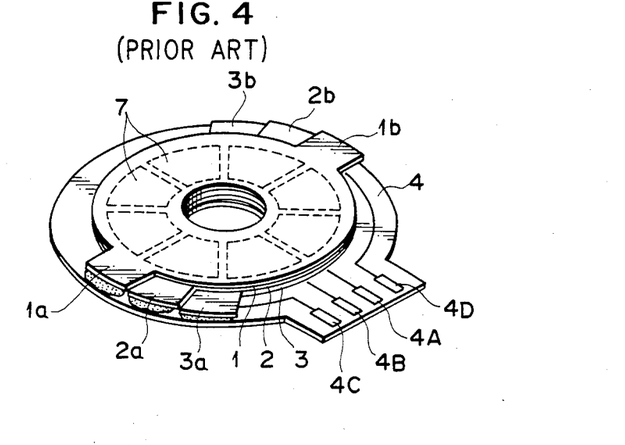
FIG. 4 is a perspective view of the laminated print coil structure in the prior art.

Referring to FIG. 4 which shows an example of the conventional laminated print coil structure, reference numerals 1, 2 and 3 designate sheets, on both sides of each of which coil patterns 7 are formed. The sheets 1, 2 and 3 are bonded to one another. One end of each of the coil patterns 7 is connected to terminals 1a, 2a and 3a, while the respective other end is connected to terminals 1b, 2b and 3b.

The sheets 1, 2, and 3 as laminated are bonded to a printed wiring board 4. The terminals 1a, 2a and 3a are connected to a predetermined wiring pattern of the wiring board 4, which patterns are led out to terminals 4A, 4B, and 4C. The terminals 1a, 2b and 3b are connected to a common predetermined wiring pattern of the wiring board 4, which pattern is led out to a terminal 4D.

Figures 5A, 5B:
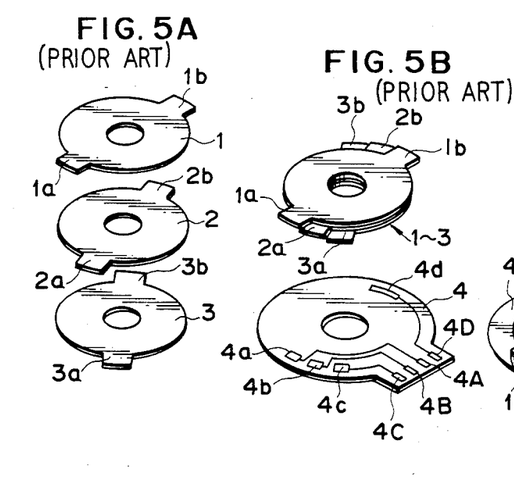
FIGS. 5A to 5C show a production step of the laminated print coil structure in FIG. 4.
Figure 5C:
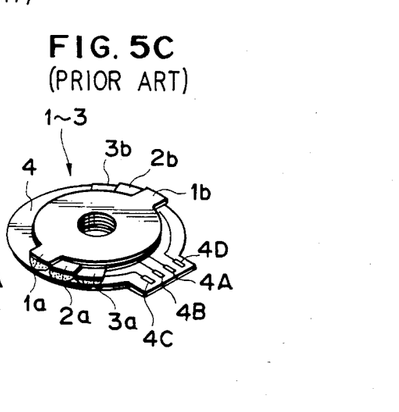

The prior laminated printed coil structure is produced as shown in FIGS. 5A to 5C, for example. First, as shown in FIG. 5A, the sheets 1, 2 and 3 having the respective coil patterns are prepared. Then, as shown in FIG. 5B, the sheets 1, 2 and 3 are bonded to one another by means of adhesive sheets (not shown). Then, as shown in FIG. 5C, the laminated sheets 1, 2 and 3 are bonded to the printed wiring board 4 by means of an adhesive sheets (not shown). Finally, the terminals 1a to 3a and 1b to 3b are connected to predetermined wiring patterns 4a to 4d of the wiring board 4 by soldering or the like.

Figure 6A:
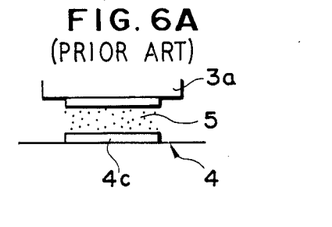
FIGS. 6A, and 7A are illustrations of the connection between the terminal of the sheet and the wiring pattern of the wiring board in FIG. 4.
Figure 6B:
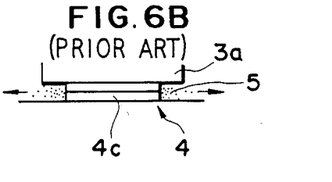

In the conventional laminated print coil structure shown in FIG. 4, there is defined almost no gap between the terminal 3a and the wiring pattern 4C of the wiring board 4, for example. Therefore, in the case that the terminal 3a is connected to the wiring pattern 4c by means of a conductive paste, reliability of connection is not satisfactory. As shown in FIG. 6A, a conductive paste 5 is interposed between the terminal 3a and the wiring pattern 4c. Then, the terminal 3a and the wiring pattern 4c are pressed to be connected with each other as shown in FIG. 6B. However, the conductive paste 5 flows out as shown by arrows, thus reducing the reliability of connection.

Figure 7A:
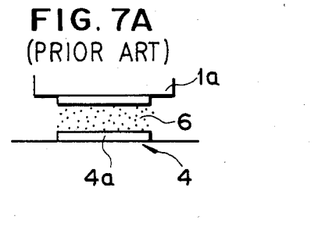
Figure 7B:
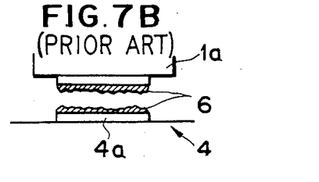

Furthermore, in the prior art shown in FIG. 4, there is defined a large gap between the terminal 1a and the wiring pattern 4a of the wiring board 4, for example. Therefore, in the case that the terminal 1a is connected to the wiring pattern 4a by soldering paste printing and subsequent reflowing, there is a possibility that the connection between the terminal 1a and the wiring pattern 4a is not attained because of shrinkage of the soldering paste. As shown in FIG. 7A, a soldering paste 7 is interposed between the terminal 1a and the wiring pattern 4a. When reflowing is carried out in the soldering paste 6 under the large gap condition, the soldering paste 6 may shrink into disconnection between the terminal 1a and the wiring pattern 4a as shown in FIG. 7B.

Accordingly, the terminals 1a to 3a and 1b to 3b are connected to the predetermined wiring patterns of the wiring board 4 by a manual soldering work, for example. However, even in the manual soldering effort, the soldering paste is difficult to apply at a large-gapped portion, thus reducing reliability of the soldering step.

SUMMARY OF THE INVENTION

It is an object of the present invention to provide a laminated printed coil structure which may make easy the connection between the terminals of the sheets and the predetermined wiring patterns of the wiring board.

It is another object of the present invention to provide a laminated printed coil structure which may ensure high reliability of the connection between the terminals of the sheets and the predetermined wiring patterns of the wiring board.

According to the present invention, there is provided a laminated printed coil structure comprising a wiring board having an insulating substrate, lead terminals and connecting pad portions connected to the lead terminals and formed on one surface of the insulating substrate, and a plurality of printed coil elements each having an insulating layer, coil patterns, a pair of terminals for the coil patterns and a connecting pad electrically isolated from the terminals formed on the insulating layer. The printed coil elements are piled up or stacked laminated on the wiring board in such a manner that the connecting pad portions of the wiring board, the terminals of the coil patterns on one of the printed coil elements and the connecting pad on another printed coil element are adjacently placed; and that each one terminal for the coil pattern in each of the printed coil elements is connected together, and that each coil pattern is led out to the lead terminals of the wiring board.

Other objects and features of the invention will be more fully understood from the following detailed description and appended claims when taken with the

DETAILED DESCRIPTION OF THE PREFERRED EMBODIMENT

Figure 1:
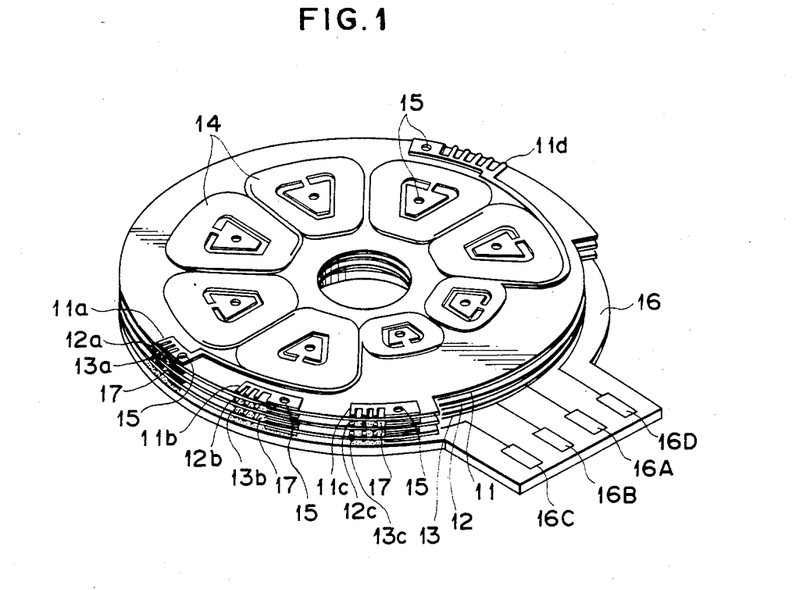
FIG. 1 is a perspective view of the laminated print coil structure of a preferred embodiment according to the present invention.

Referring to FIG. 1, reference numerals 11, 12 and 13 designate insulating sheets or layers, on both sides, of each of which coil patterns 14 are formed. Reference numerals 15 designate through-holes for electrical connection between the coil patterns 14 on both sides of each sheet and electrical connection between terminals which will be hereinafter described.

First true terminals 11a, 12b and 13c are formed on the sheets 11, 12 and 13, respectively, and are connected to one end of each of the coil patterns 14. Similarly, second true terminals 11d, 12d and 13d (the terminals 12d and 13d are not shown in FIG. 1) are formed on the sheets 11, 12 and 13, respectively, and are connected to the other end of each of the coil patterns 14. Further, dummy terminals 11b and 11c are formed on the sheet 11, and are not connected to the coil patterns 14. Similarly, dummy terminals 12a and 12c which are not connected to the coil patterns 14 are formed on the sheets 12, and dummy terminals 13a and 13b which are not connected to the coil patterns 14 are formed on the sheet 13.

All the terminals 11a to 13d have a comb-like shape and a rugged surface. The sheets 11, 12 and 13 are laminated and bonded to one another, and the laminated sheets are bonded to a printed wiring board 16. A conductive substance 17 is sandwiched between the terminals 11a and 12a, between the terminals 12a and 13a, and between the terminal 13a and a predetermined wiring pattern of the wiring board 16, thereby electrically connecting each terminal and the wiring pattern to one another. Accordingly, the true terminal 11a is electrically connected through the dummy terminals 12a and 13a to the predetermined wiring pattern of the wiring board 16, and is led out to a terminal 16A. Similarly, the terminals 11b, 12b and 13b are electrically connected to a predetermined wiring pattern on the wiring board 16 by the conductive substance 17. Accordingly, the true terminal 12b is electrically connected through the dummy terminal 13b to the predetermined wiring pattern of the wiring board 16, and is led out to a terminal 16B. Further the terminals 11c 12c and 13c are electrically connected to a predetermined wiring pattern of the wiring board 16 by the conductive substance 17. Accordingly, the true terminal 13c is electrically connected to the predetermined wiring pattern of the wiring board 16, and is led out to a terminal 16C. Further, the true terminals 11d, 12d and 13d are electrically connected to the predetermined wiring pattern of the wiring board 16, and are led out to a terminal 16D.

Figure 2A:
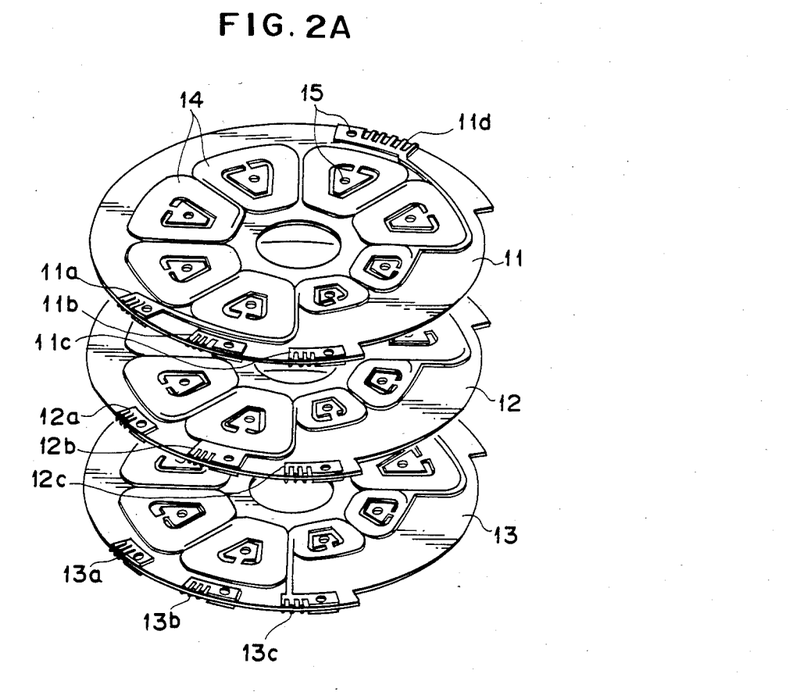
FIGS. 2A to 2D show a production process of the laminated print coil structure.

The laminated print coil structure shown in FIG. 1 is produced in such a way as shown in FIGS. 2A to 2D. First, the sheets 11, 12 and 13 on which the coil patterns 14 are formed are prepared as shown in FIG. 2A. In this case, the coil patterns 14 are formed by etching, combined etching and plating, and plate transferring, etc. The through-holes 15 are formed as required. In particular, when the coil patterns 14 are formed by the combined etching and plating technique, the through-holes 15 are electrically connected by the plating, and simultaneously the coil patterns 14 are easily enlarged. Further, the terminals 11b and 11c which are shown not connected with the coil patterns 14 of the sheet 11 are temporarily electrically connected with the terminal 11a at a portion outside of the sheet 11 until the plating step is ended (not shown). Then, the connected portion outside of the sheet 11 is cut off to form the sheet 11. The other sheets 12 and 13 are similarly formed.

Figure 2B:
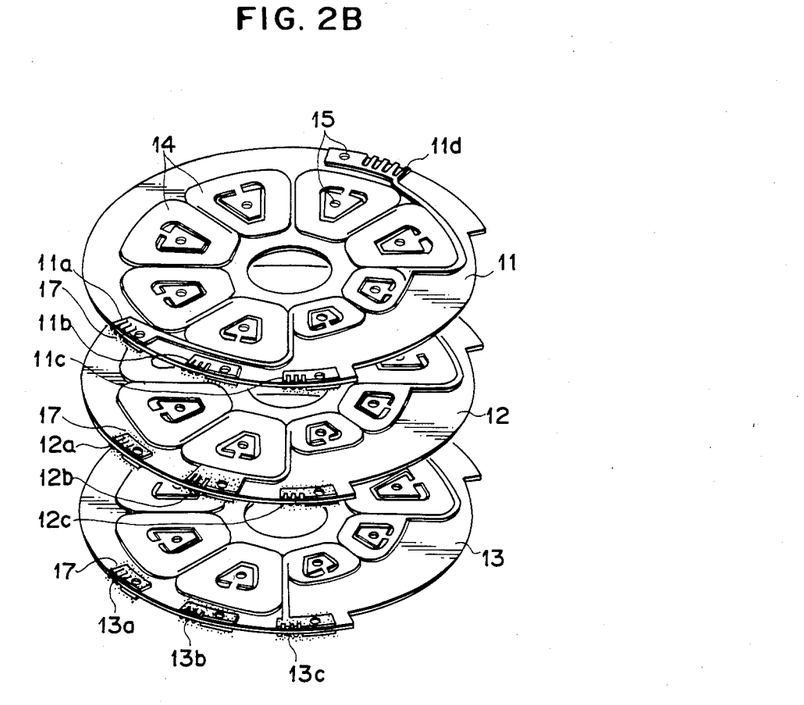

Then, as shown in FIG. 2B, the conductive substance 17 such as a conductive paste (silver paste and copper paste) or a soldering paste is coated on the terminals 11a to 11d, 12a to 12d, and 13a to 13d. In this case, the conductive substance 17 is coated in such a manner as to be pressed into recesses of the terminals by metal marking or the like.

Figure 2C:
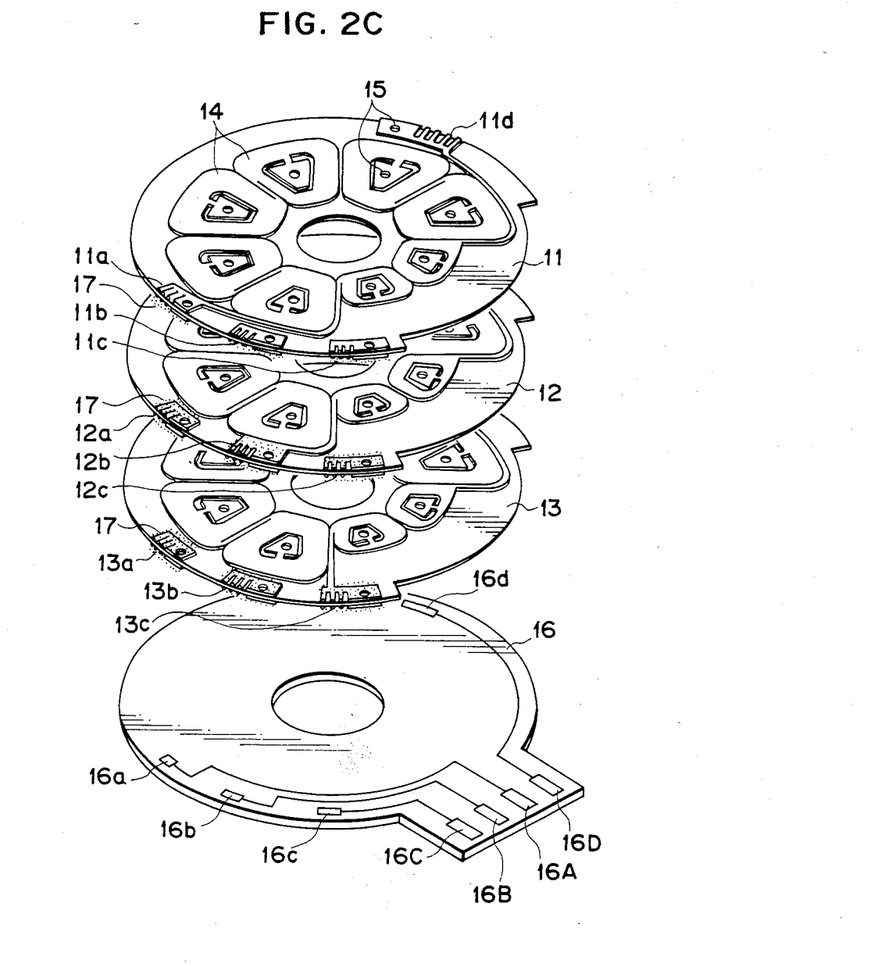
Figure 2D:
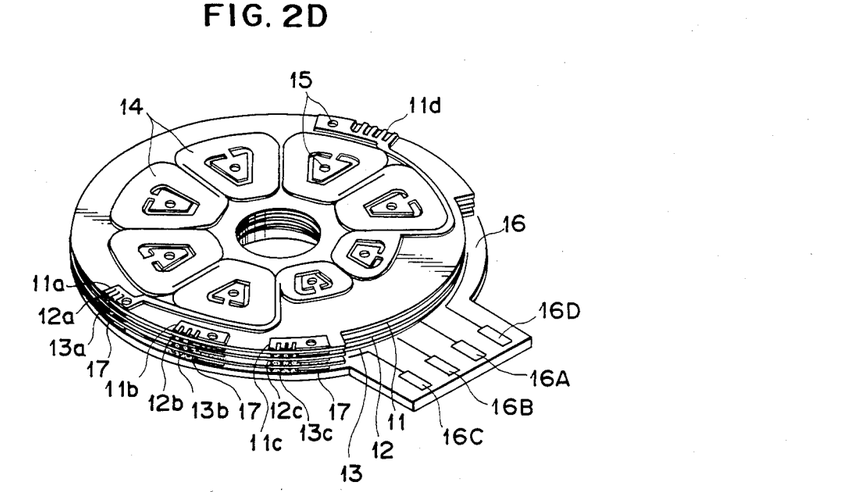

Then, as shown in FIG. 2C. the sheets 11, 12 and 13 and the printed wiring board 16 are arranged and adhesive sheets (not shown) formed of epoxy resin or urethane resin, etc. are interposed between the sheet 13 and the wiring board 16. The adhesive sheets have a shape that does not cover the terminals. Then, as shown in FIG. 2D, the laminated sheets are pressed under a pressure of kg/cm2 at 150°C. for 30 minutes, for example.

In the case that the conductive substance 17 is a conductive paste, the production of the laminated printed coil structure is completed by the above steps. However, in the case that a soldering paste is used for the conductive substance 17, the above steps are followed by a step of reflowing.

In the case that the conductive substance 17 is not coated in the above steps, the terminals are connected to one another by soldering dip, for example.

According to the preferred embodiment as mentioned above, each of the terminals 11a to 11d, 12a to 12d, and 13a to 13d has a rough surface. Therefore, when the conductive paste is used for connection of the terminals, the conductive paste is retained in the recesses of the terminals, and is prevented from flowing out in the pressing step. Further, the contact surface of the conductive paste is increased to thereby ensure high reliability of connection.

Figure 3A:
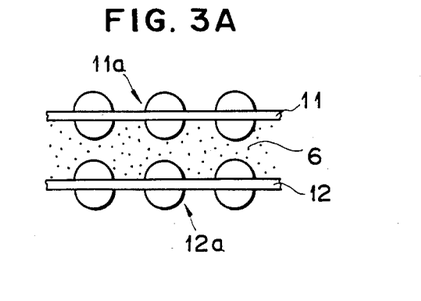
FIGS. 3A and 3B are illustrations of the connection between the terminals in FIG. 1.
Figure 3B:
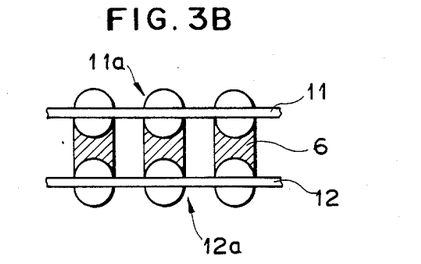

Furthermore, the surfaces of the terminals 11a to 11d, 12a to 12d, and 13a to 13d are rugged, and each gap between the surfaces of the terminals is not large. Therefore, when the soldering paste is used for connection of the terminals, the contact performance of the terminals is not reduced, to thereby ensure high reliability of connection even if the soldering paste is shrunk when molten. For instance, FIG. 3A shows a condition of the soldering paste before reflowing, and FIG. 3B shows a condition after reflowing, in which the soldering paste 6 is shrunk to 1/5 to 1/10 in volume, but it repels a resin surface while adhereing to a pattern surface with a good affinity, thereby ensuring the connection of the terminals.

Moreover, the terminals may be automatically connected by the conductive paste or the soldering paste, thereby making the connection easy.

Although the roughness of both surfaces of the terminals on the sheets 11 to 13 is arranged in symmetrical relationship to each other in the preferred embodiment, it may be arranged in alternate relationship to each other. This relationship may be also applied to the sheets 11 to 13. In sum, it is only necessary to make the surfaces of the terminals rough.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

We claim as our invention:
1. A laminated printed coil structure, comprising:
   a wiring board h aving an insulating substrate;
   lead terminals and connecting pad portions connected to said lead terminals and formed on one surface of said insulating substrate, said connecting pad portions having rough surfaces;
   a plurality of printed coil elements each having an insulating layer and coil patterns on said insulating layer, said plurality of printed coil elements being stacked one on another;
   first and second true terminals electrically connected to said coil patterns;

dummy terminals electrically isolated from said true terminals and said coil patterns;

said first and second true terminal and said dummy terminals being formed on both sides of each of said printed coil elements;

said coil patterns and said true terminal and said dummy terminals being electrically connected between both sides of said insulating layer by conductive through-holes at each of said true terminals and said dummy terminals;

each of said true terminals and said dummy terminals having a rough surface, said true terminals and said dummy terminals of respective ones of said printed coil elements beig aligned when said printed coil elements are stacked one on another;

a conductive substance interposed between said connecting pad portions and said true terminals and between said connecting pad portions and said dummy terminals and between said true terminals and said dummy terminals of said stacked printed coil elements; and intermediate adhesive layers interposed between said coil patterns of adjacent ones of said stacked printed coil elements and between said coil patterns and said insulating substrate of said wiring board.

* * * * *